May 29, 1923.
C. H. STANFIELD
GRINDER
Filed March 9, 1920
1,457,092
2 Sheets-Sheet 1
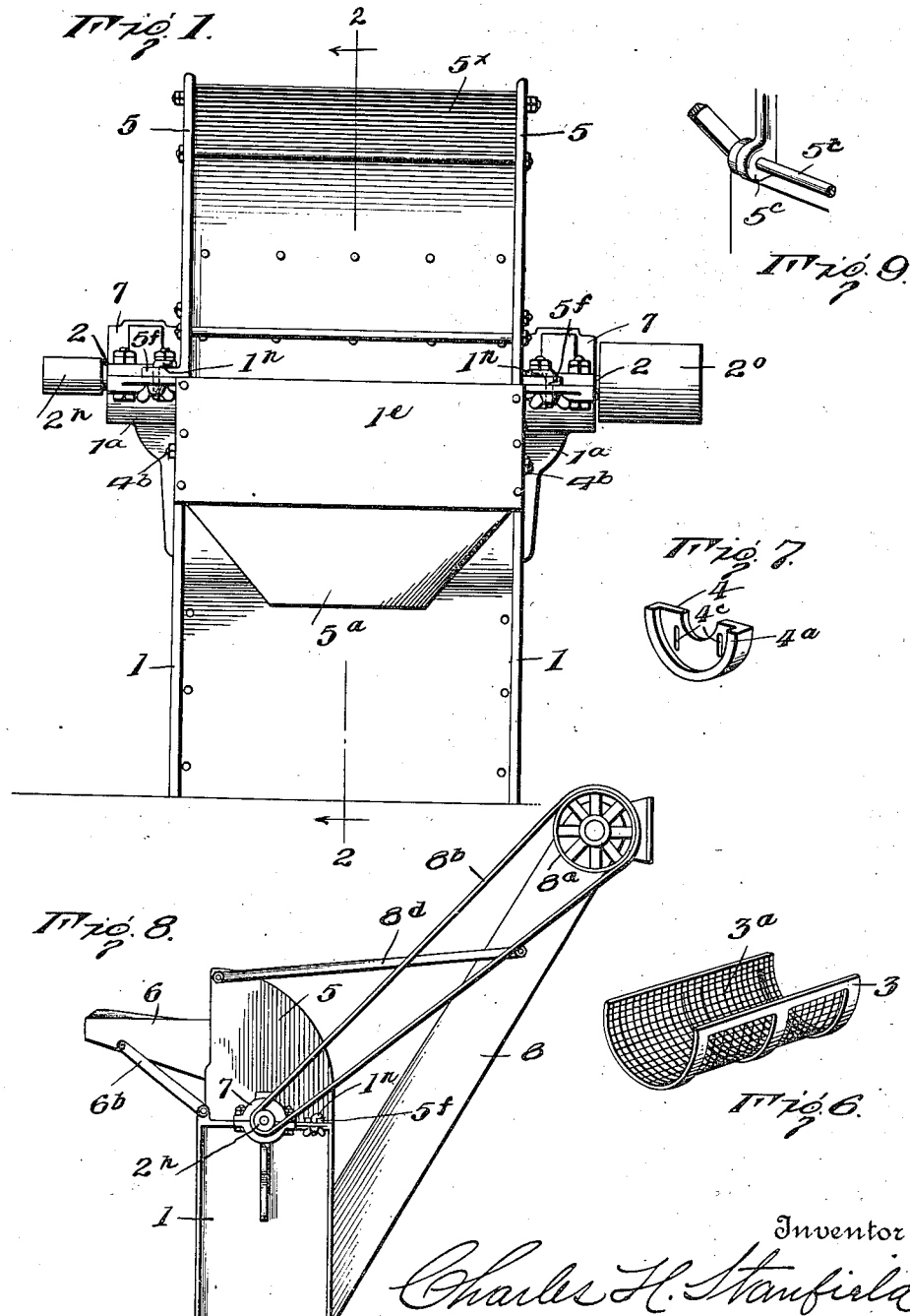

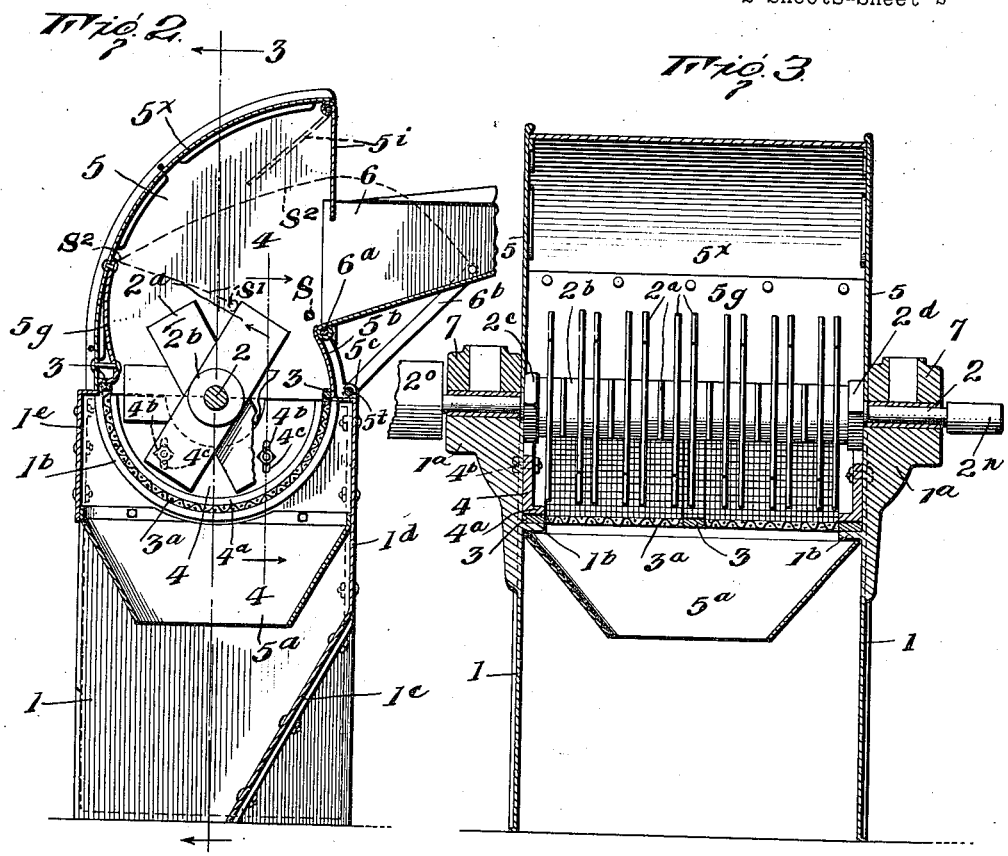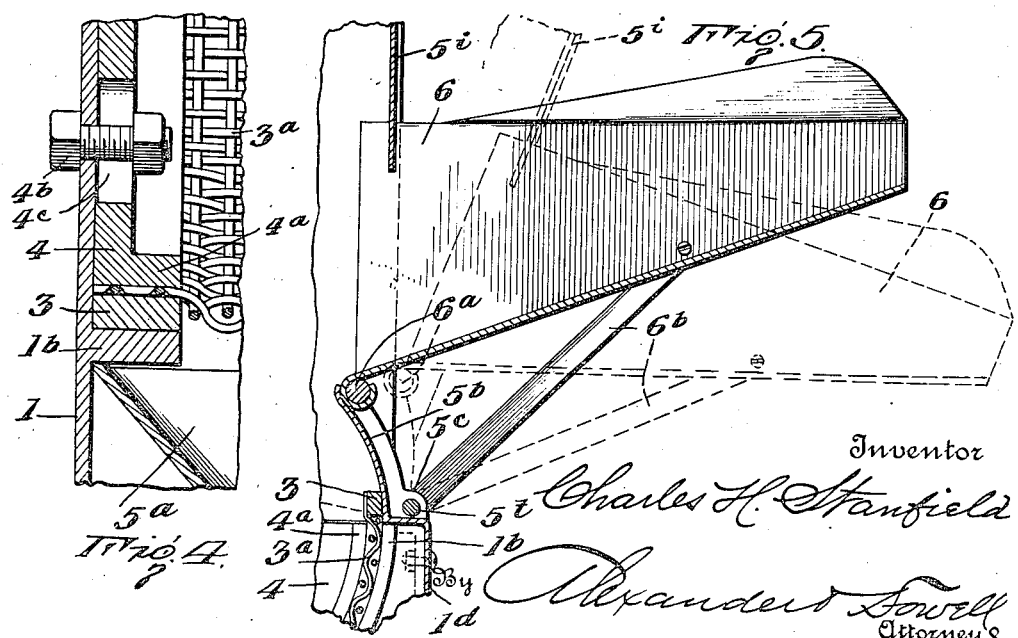

Patented May 29, 1923.

1,457,092

UNITED STATES PATENT OFFICE.

CHARLES H. STANFIELD, OF WICHITA, KANSAS.

GRINDER.

Application filed March 9, 1920. Serial No. 364,507.

*To all whom it may concern:*

Be it known that I, CHARLES H. STANFIELD, a citizen of the United States, residing at Wichita, in the county of Sedgwick and State of Kansas, have invented certain new and useful Improvements in Grinders; and I hereby declare that the following is a full, clear, and exact description thereof, reference being had to the accompanying drawings, which form part of this specification.

This invention relates to machines for grinding or reducing all kinds of animal foodstuffs, such as grain, hay, corn fodder, and other varieties of rough feed.

The object of the invention is to produce a simple inexpensive, but very durable grinder in which the grinding or reduction of the material is accomplished by a beater cylinder which is revolved at a rapid rate of speed and comminutes the material being treated and forces it through a reticulated metal screen, preferably formed of woven wire, and preferably extending half way around the beater cylinder.

I will explain the invention with reference to the accompanying drawings which illustrate one practical embodiment thereof, and then summarize in the claims the essentials of the invention and novel features of construction and novel combination of parts for which protection is desired.

In said drawings:

Fig. 1 is a rear view of the complete grinding machine.

Fig. 2 is a sectional elevation thereof on the line 2—2, Fig. 1.

Fig. 3 is a sectional elevation on line 3—3, Fig. 2.

Fig. 4 is an enlarged detail sectional view on line 4—4, Fig. 2.

Fig. 5 is an enlarged detail sectional view.

Fig. 6 is a reduced perspective view of the screen detached.

Fig. 7 is a reduced detail view of one of the screen holding plates detached.

Fig. 8 is a side view of the grinder with an elevator for the ground material attached thereto.

Fig. 9 is a detail.

The casing of the grinding machine may be of any desired construction, but preferably has a fixed lower section, and an upper section hingedly mounted on the lower section.

The lower section, as shown, is formed of similar opposite side members 1, which are provided at top with the lower halves $1^a$ of the bearings for the shaft 1 of the beater cylinder; and said members 1 are provided on their inner faces with semi-circular supports or brackets $1^b$ concentric with such shaft, on which brackets is mounted an approximately semi-circular detachable or removable grinding-concave or screen, hereinafter referred to. Below this screen may be arranged a hopper $5^a$ by which the ground material can be directed into a suitable receiver or into an elevator trunk. The front side of the lower casing section may be closed by a plate $1^d$, the lower portion of which may be inclined rearwardly as at $1^c$. The rear portion of the lower casing section below the hopper $5^a$ may be open, but above such hopper it may be closed by a plate $1^e$.

The end plates 1 may be made of cast metal and the front and rear plates $1^d$, $1^e$ made of sheet metal; and all parts of the casing are united in any desired manner, and they may be strengthened by angle irons if desired.

The upper section of the casing, as shown, has opposite end plates 5, which may be of cast metal; and plates 5 are connected by a rear curved plate $5^x$, secured to said end plates in any suitable way, and extending up over said plates to the front of the section. The lower part of the front of the upper section of the casing is formed of a curved plate $5^b$, which may be cast, and which forms part of the grinding case as indicated in Figs. 2 and 5, when the upper section of the casing is in operative position. The upper section has a feed opening in its front side with which is connected a feed chute 6, which is supported on a rod or bar $6^a$ fastened to and between the end plates 5 above plate $5^b$, and said chute is also supported by braces $6^b$, which are attached to the sides of the feed chute and preferably connected to a rod $5^t$, by which the upper section of the casing is hinged to the lower section. The front of the upper section of the casing may be closed above the feed chute 6 by a dust curtain $5^t$ hinged to a transverse rod $5^r$.

The upper section of the casing is preferably hingedly mounted on the lower section in any suitable way. As shown the plate $5^b$ has lugs $5^e$ at its ends, which lugs lie beside ears $1^e$ on the upper ends of the end plates 1, adjacent the front side of the screen frame, and through these lugs 5ᵉ and ears 1ᵉ passes the hinge rod 5ᵗ.

The construction is preferably such that the whole upper section of the casing may be tilted over (as partly indicated in dotted lines in Fig. 5) so as to uncover the grinding cylinder, and screen, to permit ready access thereto for the purpose of adjusting the cylinder, or for inserting or removing the screen.

The end plates 5 are shown as provided with slotted lugs 5ᶠ which may be engaged by bolts or retainers 1ᵃ attached to the top of the end plates 1, (Figs. 1 and 8) to fasten the upper section of the casing in closed position.

The grinding concave or screen (Fig. 6) is preferably constructed of a skeleton metal frame 3, covered with heavy reticulated screen 3ᵃ, which may be of woven wire, or perforated sheet metal; woven wire is preferred. The ends of the screen are supported upon the brackets 1ᵇ on the end plates 1; and the screen is removably fastened in place by means of clamp plates or screen retainers 4, (Fig. 7) which are shown as approximately semi-circular and are secured to the inner sides of the end plates 1 below shaft 2 and above the brackets 1ᵇ (see Figs. 2 and 4). The clamp plates 4 are preferably flanged on their curved edges, as shown at 4ᵃ, to more securely engage and hold down the oppositely curved ends of the screen. The clamp plates may be secured in position by bolts 4ᵇ passed through slots or openings 4ᶜ in the clamp-plates and through holes in the end plates 1 (see Figs. 2 and 4).

The adjustable and removable screen clamps 4 permit the use of screens which may be somewhat irregular in contour or vary in thickness. They also enable the screens to be readily removed and replaced. Screens of different mesh or size of openings can be interchangeably used in the machine if desired, as the screen clamps 4 can be readily put in place or taken out, and the screens can be readily inserted between the brackets 1ᵇ and the screen clamps when the latter are removed, or fully raised.

The grinding cylinder is preferably composed of the shaft 2 and a series of beater bars 2ᵃ strung on said shaft and spaced apart by means of washers 2ᵇ. The adjacent bars 2ᵃ are set at angles to each other so that the bars together form a spiral series of beaters extending lengthwise of the cylinder. The bars 2ᵃ may be secured to the shaft 2 in any desired manner. If desired, the bars 2ᵃ may be keyed to the shaft; but preferably they are clamped on the shaft 2 by means of right hand and left hand nuts 2ᶜ, 2ᵈ, engaging correspondingly threaded portions of the shaft. The construction of beater cylinder is known and it does not form part of the present invention. The shaft 2 is journaled in the bearings 1ᵃ on the end plates 1 and is confined in said bearing by the cap plates 7, which form complementary parts of the bearings 1ᵃ and are fastened thereto by bolts, as usual.

Preferably a filler or guard plate 5ᵍ is secured inside the upper section of the casing adjacent the rear side of the screen 3, said guard plate 5ᵍ preventing material catching upon the upper rear edge of the screen or screen frame when the guarding cylinder is operating.

This machine would be constructed in various sizes or widths from 12″ to 60″ (meaning the lengthwise dimensions of the grinding cylinder) each size of machine to be built with parts in due proportion to its size and suited for the work which it is expected to perform.

As shown in Fig. 8 the machine may be provided with a conveyor or box elevator attached to the rear of the machine. This elevator ordinarily comprises a truck 8 which may be connected at its lower end to the rear of the casing, and connected to the top portion of the casing by means of rods 8ᵈ. The trunk has an internal elevator (not shown) of any suitable usual type which may be operated by means of a pulley 8ᵃ attached to the upper carrier shaft of the conveyor and driven by a bolt 8ᵇ from a pulley 2ⁿ on the shaft 2. The pulley 2ⁿ is of very small diameter and is preferably attached to the shaft 2 by left hand screw threads, so that the rotation of the shaft 2 and drag on the pulley 2ⁿ only tends to bind such pulley more securely on the shaft.

The shaft 2 is provided with a driving pulley 2°, which may be belted to any suitable driver. I do not herein claim the elevator but simply conventionally illustrate it to show how readily it can be attached to this grinder.

The operation of the grinder is very simple. A screen of the proper size is placed in position in the lower section and the grinding cylinder is rotated in the direction indicated by the arrows on the bars 2ᵃ in Fig. 2; so that the upper part of the cylinder moves away from the feed chute. The material, properly dried, is fed into the upper section of the casing through the feed chute and is comminuted by the rapidly vibrating bars 2ᵃ which grind or rub the material against the screen until the material is reduced to such size that it can pass through the meshes of the screen. The rough wire screen enhances and facilitates the grinding operation.

A set of interchangeable screens could be provided with each grinder; and the screen changed, as desired, to suit the material to be operated upon. As stated, the screen need extend only about 180°, which I find sufficient for practical purposes. Any material which happens to come around by the grinding cylinder will be carried back and rubbed against the screen until it is comminuted.

In Fig. 2 a stone or piece of iron is indicated at S as just entering the machine; and the light dotted line S' indicates approximately the direction in which such object would probably be thrown by and away from the blades. When thrown by the blades it would probably strike the portion 5˟ of the upper part of the casing at the point S², and by reason of the curvature thereof would rebound as indicated by dotted line S².

The dust curtain 5¹ if hanging in its natural position, would stop the outward rebound of the object S, and it would again be dropped onto the cylinder and again follow approximately the same course indicated by the dotted lines. The noise caused by the striking of the object on the casing or curtain would attract the attention of the operator,—and if he would then swing the dust curtain inward by hand into the position shown in dotted lines in Fig. 2, the piece of stone or iron on its rebound will land on the feed table where it can be readily removed.

The peculiar shape of the grinder hood makes it possible for the machine to thus throw out such foreign objects as may accidentally get into the grinder mixed with hay or grain, and as the object is thrown out on the rebound it itself is not dangerous, and practically such objects can be thus thrown out of the machine without danger to either the machine or the operator.

I claim:

1. In a grinder, a casing formed of lower and upper sections; the end members of the lower section being provided with bearings for a grinding cylinder shaft, and with semi-annular brackets on their inner faces concentric with said bearings; and a semi-cylindric screen supported on said brackets concentric with said bearings, substantially as described.

2. In a grinder, a casing formed of lower and upper sections; the end members of the lower section being provided with bearings for a grinding cylinder shaft, and with semi-annular brackets on their inner faces concentric with said shaft; a grinding cylinder journaled in said bearings; a semi-cylindric screen supported on said brackets concentric with said shaft; and semi-circular clamp-plates attached to the said end members below said shaft and above the screen and securing the ends of said screen on said brackets, substantially as described.

3. In a grinder a casing formed of lower and upper sections; the end members of the lower section being provided with bearings for a grinding cylinder shaft, and with inwardly projecting semi-annular brackets below and concentric with said bearings; a grinding cylinder mounted in said bearings; a removable interchangeable semi-cylindric screen adapted to be supported on said brackets concentric with semi-circular screen clamp plates adjustably attached to the end members of the casing below said shaft, and overlying the ends of said screen opposite said brackets, and bolts securing said clamp plates to the end members of the casing, substantially as described.

4. In combination a casing formed of lower and upper sections, the lower section being provided with bearings for a grinding cylinder shaft; a grinding cylinder mounted on said shaft, the upper section having a feed inlet in one side, the opposite wall of said upper section being curved toward and above the inlet whereby foreign matters thrown by the grinding cylinder against said curved wall will be directed out of the casing; a feed chute beside the inlet; and a swinging curtain connected to said upper section above said feed inlet, substantially as described.

5. In a grinder as set forth in claim 1; the upper casing section having a feed inlet in its front wall and its rear wall bent upwardly and forwardly and extending to and above the feed inlet, whereby foreign matters thrown by the grinding cylinder against said curved wall will be directed outside said casing, substantially as described.

6. The herein described grinder, comprising a casing formed of lower and upper sections; the end members of the lower section being provided with bearings for a grinding cylinder shaft; a grinding cylinder mounted in said bearings; a removable interchangeable semi-cylindric screen concentric with said shaft; clamp plates securing said screen in place; the upper section of the casing having a feed inlet in one side and its opposite wall curved upwardly and forwardly toward and above the inlet whereby foreign matters thrown by the grinding cylinder against said curved wall will be directed out of the casing; a guard plate at the lower side of the curved wall of the upper section, and a feed chute beside the inlet, substantially as described.

7. The herein described grinder, comprising a casing formed of lower and upper sections; the end members of the lower section being provided with bearings for a grinding cylinder shaft, and with inwardly projecting semi-annular brackets below and concentric with said shaft; a grinding cylinder mounted in said bearings; a removable interchangeable semi-cylindric screen supported on said brackets concentric with said shaft; the upper section of the casing having a feed inlet in one side and its opposite wall curved upwardly and forwardly toward and above the inlet whereby foreign matters thrown by the grinding cylinder against said curved wall will be directed out of the casing, and a feed chute beside the inlet, substantially as described.

8. The herein described grinder, comprising a casing formed of lower and upper sections; the end members of the lower section being provided with bearings for a grinding cylinder shaft, and with inwardly projecting semi-annular brackets below and concentric with said shaft; a grinding cylinder mounted in said bearings; a removable interchangeable semi-cylindric screen supported on said brackets concentric with said shaft; screen clamp plates attached to the said end members below said shaft and securing said screen on said brackets, the upper section of the casing having a feed inlet in one side, and its opposite wall curved upwardly and forwardly toward and above the inlet to direct foreign matters thrown by the grinding cylinder against said curved wall out of the casing; a guard plate at the lower side of the curved wall of the upper section; a feed chute beside the inlet; and a swinging curtain connected to said upper section above said feed chute, substantially as described.

In testimony that I claim the foregoing as my own, I affix my signature.

CHARLES H. STANFIELD.